UNITED STATES PATENT OFFICE

1,961,603

HEAT ABSORBING GLASS

Edwin Berger, Jena, Germany, assignor to the firm Jenaer Glaswerk Schott & Gen., Jena, Germany No Drawing. Application November 7, 1931, Serial No. 573,715. In Germany November 13, 1930

7 Claims. (Cl. 106—36.1)

I have filed an application in Germany, November 13, 1930.

When manufactured under reducing conditions, silicate glasses containing iron oxide can, as is well known, absorb considerable quantities of heat rays. By silicate glasses are to be understood in this case as well as in the following description glasses containing not only mono, bi or trivalent glass-forming oxides but also at least 25% of silicic acid ($SiO_2$). The content of ferrous oxide (FeO) is to amount to at least 0.2%.

When given such a quantity of iron oxide and such a thickness that the heat absorption reaches and surpasses approximately 60%, these glasses have according to the composition and strength of the reducing effect during the melting process either a deeply blue or a blue-green colour. This phenomenon is due to the absorption of light caused in these glasses by reduced iron oxide beginning perceivably already for wave-lengths of approximately 500 m$\mu$ and, as the wave-length grows, increasing only slowly until a maximum is reached at approximately 1000 m$\mu$. In consequence thereof, a considerable part of the red end of the visible spectrum is absorbed and the glass appears to be blue or blue-green in colour.

It has been found out that the absorption curve between the above mentioned values is far steeper and increases abruptly in the next neighbourhood of the red end of the spectrum when heat absorbing silicate glasses have their silicic acid content replaced entirely or partly by phosphoric acid ($P_2O_5$) and when, by a reducing melting, by applying reducing additions to the batch and by introducing the same in a suitable manner it is aimed at dissolving the iron pigment as far as possible as ferrous oxide. In order to obtain a favourable absorption process, the phosphoric acid content of these phosphate glasses is to amount to at least 25%. The silicic acid content is conveniently below that of phosphoric acid.

Ferrous oxide-phosphate glasses of this kind are practically without any colour even when their absorption of ultra-red heat rays assumes considerable values and rises above 90%. Contrary to ferrous oxide-silicate glasses, this absorption is practically equal for all rays above approximately 1000 m$\mu$. In the visible spectrum this absorption is only slight and it becomes stronger in the ultra-violet below 350 m$\mu$ when bivalent glass oxides are missing in the ferrous oxide-phosphate glass. By adding such bivalent oxides, especially oxides having a high molecular weight, the beginning of a stronger absorption can be displaced towards the greater wave-lengths.

It has been further discovered that similarly good heat absorbing capacities can be attained without any noticeable selective absorption in the visible spectrum, that is to say with practically colourless glasses, also when the silicic acid of the ferrous oxide-silicate glasses is entirely or partly replaced by boric acid ($B_2O_3$), in which case the glass is to contain at least 25% of boric acid.

As a rule the solubility in water is more pronounced with such ferrous oxide-borate glasses than with phosphate glasses. However, by substituting phosphoric and boric acid for the silicic acid of the ferrous oxide-silicate glasses and by adding at least 10% of alumina ($Al_2O_3$) or aluminium compounds corresponding to at least these 10% of alumina, it is possible to effectively reduce the solubility in water without noticeably impairing the favourable absorption capacities in the ultra-red and visible regions. In this case the content of phosphoric and boric acids ($P_2O_5+B_2O_3$) is to amount to at least 25%.

The absorption capacities of such ferrous oxide-phosphate, ferrous oxide-borate, and ferrous oxide-phosphate-borate glasses naturally can be varied considerably in the visible and in the ultra-violet regions of the spectrum by adding colour oxides or rare earths, the effects of which are found in a simple manner by means of an experiment with phosporus salt or borax pebbles. As in the case of silicate glasses, reducing the coefficient of expansion by adding the slightest possible quantity of alkali ($Na_2O$ and $K_2O$) provides a good heat resistance.

The following table gives some examples of the composition of the glasses according to the invention. The absorption numbers refer to a thickness of glass of two millimeters, having which the glasses are practically colourless to the eye.

|  | A | B | C | D | E | F | G | H |
|---|---|---|---|---|---|---|---|---|
| $SiO_2$ |  |  | 20 |  |  |  |  |  |
| $P_2O_5$ | 70 |  | 60 | 60.7 | 70.7 | 58 | 60 | 40 |
| $B_2O_3$ |  | 85 | 5 | 3 | 4 | 15 | 15 | 30 |
| $Al_2O_3$ |  |  | 5 | .8 | 10 |  |  | 10 |
| $Na_2O$ | 5 | 5 |  |  |  |  |  |  |
| $K_2O$ |  | 10 |  |  | 10 | 1 |  | 10 |
| MgO |  |  |  |  | 4 | 5 |  | 10 |
| CaO |  |  |  |  |  | 11 | 24 |  |
| BaO | 25 |  | 10 | 23 |  | 2 |  |  |
| ZnO |  |  |  |  |  | .8 | 1 |  |
| $As_2O_3$ |  |  |  | 0.3 | 0.3 |  |  |  |
| FeO | 2.5 | 2.5 | 2.5 | 2.5 | 2.5 | 3.75 | 2.0 | 2.5 |
| Absorption for ultra-red | 72% | 60% | 89% | 88% | 90% | 97% | 74% | 83% |
| Absorption for the visible region | 10% | 5% | 10% | 9% | 5% | 3% | 7% | 10% |

The properties indicated in the table are only partly a consequence of the composition; they are considerably influenced by the strength of the reducing effect during the melting and cooling as well as by the manner in which the iron dye is added. Carbon and carbonic matters, causing as they do a yellow colouring, do in general not reduce in a very satisfactory way and sometimes produce dark red-brown colours. These difficulties can be avoided by adding phosphorus compounds of low oxidation, for instance compounds ranging from calcium hypophosphite ($Ca[H_2PO_2]_2$) to phosphides, for instance iron phosphide ($Fe_3P$). Using such reducing raw material is very advantageous also in the case of other glasses which require the greatest possible reducing effects.

I claim:

1. A heat absorbing glass containing at least 0.2% of ferrous oxide (FeO), phosphoric acid ($P_2O_5$), and boric acid, the total of phosphoric acid and boric acid amounting to at least 25%.

2. A heat absorbing glass containing at least 0.2% of ferrous oxide (FeO), boric acid and at least 25% of phosphoric acid ($P_2O_5$).

3. A heat absorbing glass containing at least 0.2% of ferrous oxide (FeO), phosphoric acid ($P_2O_5$), and at least 25% of boric acid.

4. A heat absorbing glass containing at least 0.2% of ferrous oxide (FeO), silicic acid, phosphoric acid ($P_2O_5$), and boric acid, the total of phosphoric acid and boric acid amounting to at least 25%, and the percentage of silicic acid not surpassing that of phosphoric acid.

5. A heat absorbing glass containing at least 0.2% of ferrous oxide (FeO), at least 10% of alumina ($Al_2O_3$), phosphoric acid ($P_2O_5$), and boric acid, the total of phosphoric acid and boric acid amounting to at least 25%.

6. A heat absorbing glass containing at least 0.2% of ferrous oxide (FeO), aluminium compounds corresponding to at least 10% of alumina ($Al_2O_3$), phosphoric acid ($P_2O_5$), and boric acid, the total of phosphoric acid and boric acid amounting to at least 25%.

7. A method of manufacturing glasses according to claim 1, phosphorus compounds of a lower degree of oxidation than the pentavalent oxide being added to the batch or the molten glass.

EDWIN BERGER.